United States Patent [19]

Takata

[11] 4,217,005
[45] Aug. 12, 1980

[54] DECELERATION RESPONSIVE LOAD RESPONSIVE BRAKE PRESSURE CONTROL DEVICE

[75] Inventor: Koji Takata, Itama, Japan

[73] Assignee: Sumitomo Electric Industries, Ltd., Osaka, Japan

[21] Appl. No.: 8,338

[22] Filed: Jan. 31, 1979

[30] Foreign Application Priority Data

Feb. 3, 1978 [JP] Japan .................... 53-11594
Mar. 3, 1978 [JP] Japan .................... 53-24836

[51] Int. Cl.² ............................................. B60T 8/14
[52] U.S. Cl. ............................. 303/24 F; 303/6 C
[58] Field of Search ............ 188/195, 349; 303/6 C, 303/22 R, 24 A, 24 C, 24 F, 84 R, 84 A

[56] References Cited

U.S. PATENT DOCUMENTS

| 3,729,237 | 4/1973 | Ishikawa et al. ......... 303/6 C X |
| 3,838,887 | 10/1974 | Stelzer ..................... 303/6 C |
| 3,937,523 | 2/1976 | Ayers, Jr. et al. ........ 303/6 C |
| 4,085,978 | 4/1978 | Nogami ............... 303/24 F X |
| 4,093,314 | 6/1978 | Kozakai .................. 303/24 F |
| 4,113,318 | 9/1978 | Doi ........................ 303/24 F |

FOREIGN PATENT DOCUMENTS 2748699  5/1978  Fed. Rep. of Germany .......... 303/6 C Primary Examiner—Duane A. Reger
Attorney, Agent, or Firm—Wenderoth, Lind & Ponack

[57] ABSTRACT

A deceleration-sensitive, load-responsive brake pressure control device for a vehicle braking system having two fluid circuits for rear brakes. The deceleration sensors are provided in only one circuit, but adapted to control both circuits. This simplifies the construction of the pressure control device and reduces its manufacturing cost.

13 Claims, 5 Drawing Figures

DECELERATION RESPONSIVE LOAD RESPONSIVE BRAKE PRESSURE CONTROL DEVICE

The present invention relates to a load-responsive brake pressure control device for use in a motor vehicle brake system having two independent fluid circuits for rear wheels.

For double-channel brake systems in which one part of the brake system of the rear wheels is governed by one fluid circuit and the other part is by the other circuit, two pressure control or porportioning valves are generally required to limit or reduce the pressure for the rear brakes with respect to the pressure for the front brakes in the higher ranges of brake pressure above a predetermined value (hereinafter called the cut-in pressure or point), thereby avoiding rear wheel skidding. To meet this requirement, double brake pressure control devices having two identical proportioning valves in a single housing have been developed.

In applications where there is a considerable difference between the unladen vehicle load and the laden vehicle load, it is desirable that the proportioning valves be of the so-called load-responsive type, the operation (commonly the cut-in pressure) of which can follow the change of the load automatically. Among various types of load-responsive proportioning valves that have been developed, the so-called deceleration-sensitive type ones having their cut-in pressure controlled through the fluid pressure upon the occurrence of a predetermined deceleration have advantages of easy adjustment of the mounting position of the whole control device and less susceptibility to the influences of deterioration of the main spring of the vehicle.

However, the use of this type of proportioning valve in the above described brake system would require two deceleration sensors that are relatively expensive. This makes the braking pressure control device highly complicated and expensive.

An object of this invention is to provide an inexpensive double-channel load-responsive brake pressure control device which employs a single deceleration sensor to control two fluid circuits.

Such a control device must meet the following two requirements: firstly, when the two fluid circuits are in a normal condition, the two control valves must function as a load-responsive valve and their output pressures for the rear brakes must be substantially equal. Secondly, if either fluid circuit should fail, the control valve in the intact circuit must either have its cut-in pressure increased to substantially twice the level under the normal conditions or higher (under the same load condition, of course), or continue to supply the same pressure as the pressure for the front brakes without performing any pressure reducing function.

It is to be noted that the control device may behave in the event of failure in the first circuit in a different manner from that in the event of failure in the second circuit, provided in either case the abovementioned two requirements are fully met.

In accordance with this invention, a known load-responsive control valve with a deceleration sensor is provided in the first circuit, whereas in the second circuit, substantially the same output pressure as the output pressure of the first circuit is obtained without the use of a deceleration sensor by one of the following three arrangements.

The first arrangement is to use a follower valve in the second circuit to obtain substantially the same output pressure as that from the first circuit. In this arrangement, any type of a deceleration-sensitive, load-responsive control valve may be used in the first circuit. The follower valve must have means for disabling or bypassing itself if the first circuit should fail. On the other hand, should the second circuit fail, the control valve used in the first circuit either operates at the cut-in point substantially twice or more of that in the normal state or does not limit or reduce the brake pressure at all.

In the second arrangement, a deceleration-sensitive, load-responsive control device comprising a proportioning valve and a deceleration sensor is provided in the first circuit whereas a proportioning valve only is provided in the second circuit. The sealed control pressure obtained in the first circuit controls the proportioning valves in both circuits at the same time to determine their cut-in point, thus assuring that the output pressures from the two fluid circuits are substantially equal.

The deceleration-sensitive, load-responsive control device used in the first circuit in this arrangement includes a deceleration sensing inertia body supported on a guide surface the inclination of which is variable according to the braking fluid pressure.

In the second arrangement, the cut-in point for the proportioning valve in the first circuit is increased in the event of failure of the second circuit since the fluid pressure for attaining the same deceleration increases. The second circuit must have some means for bypassing or disabling the proportioning valve in the second circuit in the event of failure in the first circuit.

In the third arrangement, a deceleration-sensitive, load-responsive pressure control valve having a deceleration sensor and means for converting the sealed control pressure to a thrust corresponding to a desired cut-in pressure is employed in the first circuit, the same thrust being used to control the proportioning valve in the second circuit so that the output pressures from both circuits are substantially equal.

For a deceleration-sensitive, load-responsive control valve of a type used in the third arrangement, a delay valve can be employed to obtain the sealed control pressure proportional to the desired control thrust. Also, part of the thrust can be carried and nullified by an offset spring to reduce the thrust to a level proportional to the cut-in pressure and suitable for the vehicle load.

In the third embodiment, a member for distributing the control thrust to two proportioning valves is so adapted as to distribute the control thrust evenly to two proportioning valves when both circuits are alive, but its distributing function is blocked prematurely if either one of the circuits fails. Thus, the proportioning valve in the intact circuit would be disabled. However, means for bypassing or disabling the proportioning valve in the intact circuit may be provided as in the second arrangement.

Other features and advantages will become apparent from the following description taken with reference to the accompanying drawings, in which.

Figure 1:
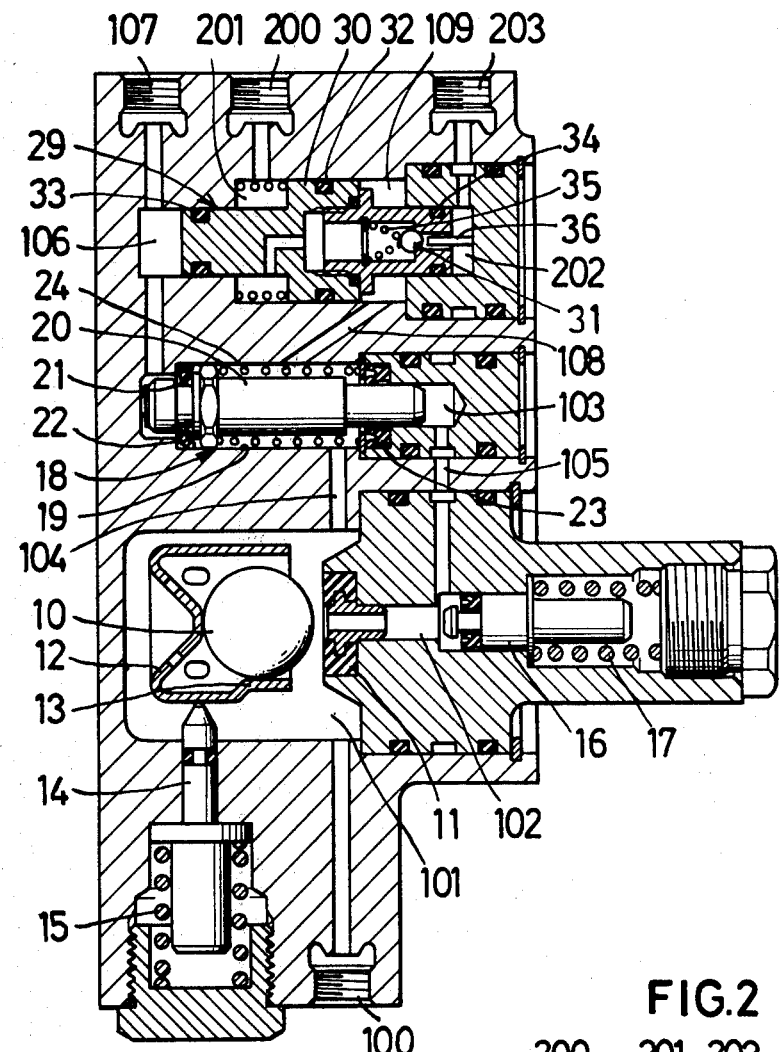
FIG. 1 is a sectional view of the first embodiment of this invention.

Referring to the drawings, wherein like reference numerals designate like or corresponding parts, FIG. 1 illustrates the first embodiment in which a deceleration-sensitive, load-responsive pressure control valve in the first circuit is combined with a follower valve in the second circuit. Fluid under pressure is delivered through an inlet 100 of the first circuit into an inertia valve chamber 101 where it pushes down a piston 14 against the bias of a spring 15. As the piston moves down, a ball cage 12 containing a ball 10 tilts counterclockwise about its fulcrum (not shown) provided perpendicular to the plane of FIG. 1 and in alignment with the center of the ball 10 when it is seated on a seat 11. The guide surface 13 for the ball 10 tilts accordingly. When the ball 10 is subjected to a deceleration large enough to overcome the gradient, it rolls up along the inclined guide surface 13 to butt against the seat 11, blocking the passage leading from the inertia valve chamber 101 to a sealing chamber 102. this means that the fluid pressure for controlling the cut-in pressure of the proportioning valve has now been sealed in the sealing chamber 102, said control pressure corresponding to the desired value suitable for the load of the vehicle.

A pressure proportioning valve 18 has a valve body 20 provided with a seal 22 adjacent to its left-hand end. The valve body has its right-hand end exposed in a chamber 103 connecting to the sealing chamber 102 and thus subjected to the sealed control pressure. A chamber 19 housing the valve body 20 is connected through a passage 104 and the inertia valve chamber 101 to the inlet 100 of the first circuit. As the input pressure further increases after the ball 10 has seated on the seat 11 to determine the pressure in the sealing chamber 102, the valve body 20 moves rightwardly against a spring 24 until the seat 21 butts against the seal 22 to close the valve to prevent pressure increase. In response to further pressure increase at the inlet side, the valve body 20 moves leftwardly so that the valve will reopen to allow a certain amount of fluid to flow to the outlet. By repeating this closing and opening, the proportioning valve 18 reduces the output pressure for the first circuit at a predetermined reduction ratio after it has reached the cut-in point, that is, the pressure at which the proportioning valve starts to operate, said pressure depending on the load of the vehicle. A buffer piston 16 and a spring 17 are provided in a conduit connecting to the sealing chamber 102 to absorb the increase of the sealed pressure resulting from the reduction in the volume of the chamber 103 due to the rightward movement of the valve body 20.

A follower valve 29 includes a valve body 30 and a valve 31 in the form of a ball. A large seal 32 and smaller seals 33 and 34 divide the valve body 30 into a pair of smaller workng area portions and a pair of larger working area portions. On the former portions, the pressure in the chamber 106 connected to the outlet 107 of the first circuit is balanced by the pressure in the chamber 202 connected to the outlet 203 of the second circuit. Also, on the latter portions, the pressure in the chamber 201 connected to an inlet 200 of the second circuit is balanced by the pressure in the chamber 109 connected through a passage 108 to the chamber 19 subjected to the inlet pressure of the first circuit.

If the pressures supplied from a pressure source to the first and second circuits are substantially equal, the valve body 30 remains stationary since the forces acting on its larger working area portions balance each other. When the proportioning valve 18 starts to reduce the braking pressure for the first circuit, the valve body 30 moves leftwardly so that the valve closes because a spring 35 presses a ball 31 against the seat. When the output pressure from the first circuit becomes larger than the output pressure of second circuit existing in the chamber 202, the valve body moves rightwardly so that a rod 36 pushes the ball 31 against the spring 35 away from the seat to open the valve, thus permitting the inlet of the second circuit to communicate with the outlet to increase the pressure in the chamber 202. When the outlet pressure of the first circuit becomes smaller than the outlet pressure of the second circuit, the valve body moves leftwardly to close the valve as mentioned before. This disconnects the inlet of the second circuit from its outlet, and increases the volume at the outlet side of the second circuit. This means that the output pressure of the second circuit has decreased and followed the output pressure of the first circuit.

If the first circuit should fail, there would exist no pressure in the first circuit. Only the pressure for the second circuit acts on the follower valve 29 at the left-hand side of its larger working area portion and at the right-hand end of its smaller working area portion. Because of the difference in the working area, the valve is moved to its extreme right full-open position so that the brake pressure for the second circuit passes through the valve 29 to the outlet 203 with no reduction.

If the second circuit should fail, the operating brakes would only half their effective wheel cylinder area and thus the pressure required for obtaining the same rate of deceleration would double. The increased pressure delivered to the first circuit presses down the piston 14 further. This increases the deceleration in response to which the inertia valve should operate, thus increasing the sealed control pressure more than twice compared with the value when both circuits operate normally. In other words, should the second circuit fail, the cut-in point or the pressure at which the proportioning valve in the first circuit becomes effective increases sufficiently, practically disabling the pressure limiting or reducing function of the proportioning valve.

The enlarged portion of the valve body 30 is provided to assure the opening of the valve 31 in the event of failure in the first circuit. Instead of providing the enlarged portion, an auxiliary bypass valve may be provided in parallel with the follower valve so that the pressure for the seecond circuit will bypass the follower valve upon failure in the first circuit.

Figure 2:
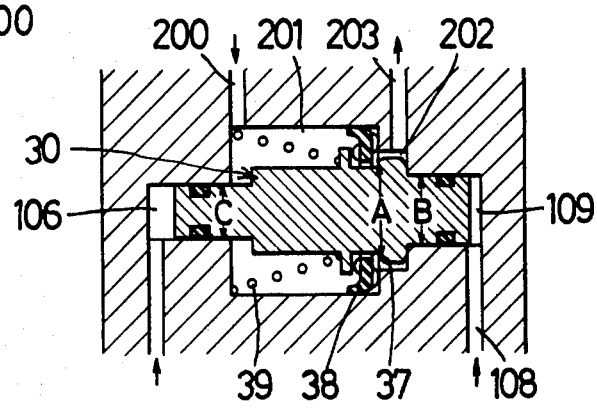
FIG. 2 is a sectional view of a variation of the follower valve used in the first embodiment.

Referring to FIG. 2 showing a variation of the follower valve, the valve body 30 has a sealing shoulder 37 which when urged to the left, butts against the inner edge of a seal ring 38 and closes the valve. The forces acting on the valve body 30 in the valve opening direction are the output pressure of the first circuit at the chamber 106 and the input pressure of the second circuit working on the annular portion formed between the effective area A at the shoulder 37 and the effective area C of the chamber 106. The forces acting on the valve body 30 in the valve closing direction are the output pressure of the second circuit working on the annular portion formed between the effective area A at the shoulder 37 and the effective area B of the chamber 109 and the input pressure of the first circuit at the chamber 109.

The arrangement is such that the effective area C of the chamber 106 is equal to the effective area A at the shoulder 37 minus the effective area B of the chamber 109 and thus the effective area B is equal to the area A minus the area C. The effective area C is selected to be smaller than the effective area B.

A small spring 39 urges the valve body 30 in the valve opening direction, but its force is not so large but just enough to overcome the sliding resistance between the seals and the inner wall of the valve.

It will be understood that the relationship between the forces acting on the valve body in the arrangement of FIG. 2 is exactly similar to that in the arrangement of FIG. 1. The follower valve of FIG. 1 can, therefore, be replaced by that of FIG. 2.

Figure 3:
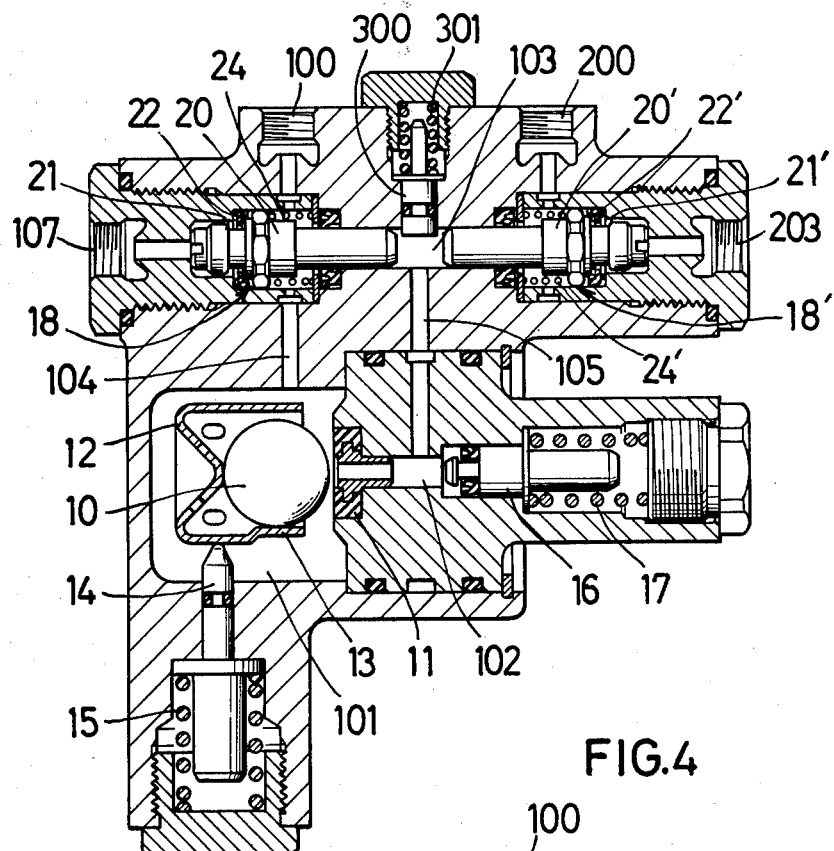
FIG. 3 is a sectional view of the second embodiment thereof.

FIG. 3 illustrates the second embodiment in which two control or proportioning valves are controlled by the same sealed control pressure.

The fluid pressure from the inlet 100 for the first circuit pushes down the piston 14 against the spring 15 to incline the guide surface 13 for the ball 10. This changes the deceleration in response to which the ball 10 seats on the seat 11 to close the valve and bring the relationship between the load and the sealed control pressure into a desired one. The sealed control pressure thus determined controls the operation of both proportioning valves 18 and 18' so that the pressure at the outlet 107 for the first circuit will be substantially equal to the pressure at the outlet 203 for the second circuit.

In the event of failure in the first circuit, a stop piston 300 urged by a spring 301 remains projecting because no sealed pressure prevails in the chamber 103. Therefore, the piston prevents the valve body 20' from moving leftwardly for a sufficient stroke to allow the seat 21' to seat on the seal 22'. Thus, the proportioning valve 18' for the second circuit does not close or perform any pressure reducing or limiting function. If both circuits are in a normal condition or if either circuit fails, the second embodiment will show substantially the same output characteristics as the first embodiment. In the second embodiment, instead of the stop piston 300 for limiting the stroke of valve body 20' in case of failure in the first circuit, a bypass valve may be provided in parallel with the proportioning valve in the second circuit to bypass the proportioning valve if the input, output or sealed pressure of the first circuit should not reach a predetermined level in relation to the pressure of the second circuit.

Figure 4:
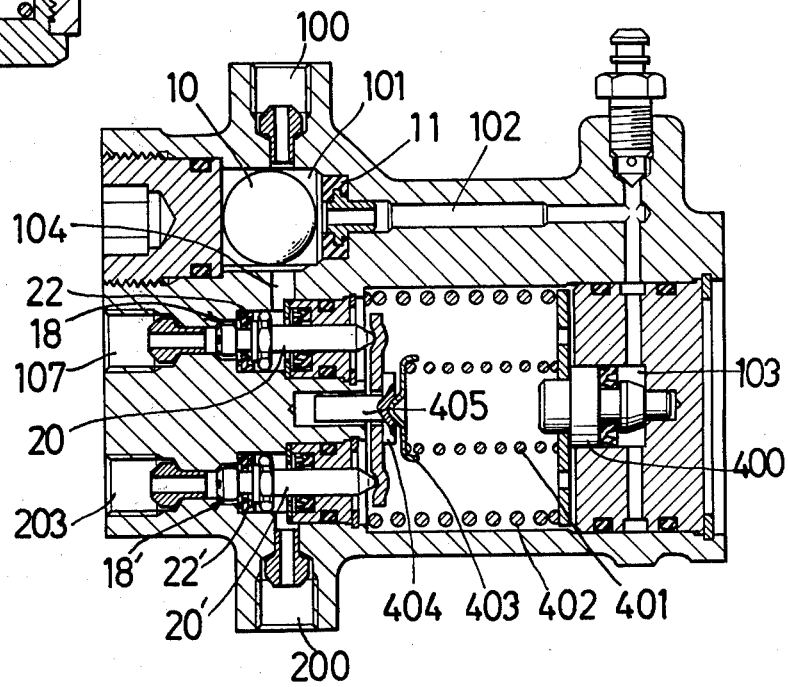
FIG. 4 is a sectional view of the third embodiment thereof.

FIG. 4 illustrates the third embodiment in which unlike the first and second embodiments, no piston for changing the inclination of the guide surface for the deceleration sensor is provided. The deceleration at which the inertia valve operates is fixed at a value determined by the angle at which the whole control device is mounted on the vehicle. In other words, while in the first and second embodiments the sealed control pressure itself is adjusted to the desired value in accordance with the load of the vehicle, it is merely proportional to the load in the third embodiment.

In this embodiment, a desired relationship between the load and the cut-in pressure is achieved by a combination of two springs 401 and 402.

The pressure sealed in the sealing chamber 102 acts on a thrust piston 400. Part of the thrust given by the thrust piston 400 is carried and nullified by an outer or offset spring 402 and the rest thereof is transmitted through an inner spring 401 and a spring retainer 403 to an equalizer 404. The thrust, which corresponds to a desired cut-in pressure depending on the vehicle load, is distributed to two proportioning valves 18 and 18'. Thus, the braking pressure for the first circuit from the inlet 100 passes through the inertia valve chamber 101 and a passage 104 into the proportioning valve 18 where it is reduced to a suitable level and is supplied through an outlet 107 to a rear brake. On the other hand, the braking pressure for the second circuit from the inlet 200 is reduced by the proportioning valve 18' in the same manner. This arrangement ensures that the output pressures from the first and second circuits are substantially equal to each other.

If either circuit should fail in this embodiment, the valve body of the proportioning valve in the inoperative circuit would remain stationary because no pressure exists while only the valve body in the intact circuit would tend to move to the right. This causes the equalizer 404 to tilt with its stem 405 butting against one side wall in the guide hole for the stem. The stem prevents the valve body at the intact side from moving freely to the right. Therefore, the proportioning valve in the intact circuit would be blocked and not function to reduce the braking pressure so that the input pressure is supplied through the outlet without being regulated.

Although in this embodiment the outer spring is used to obtain a desired cut-in point from the sealed control pressure determined by a fixed deceleration, a delay valve may instead be provided upstream of the inertia valve so as to reduce the pressure at the inertia valve chamber by a predetermined amount, thereby obtaining a sealed control pressure corresponding to the desired cut-in pressure. Alternatively, a delay valve may be inserted between the sealing chamber and the thrust piston so as to reduce the sealed pressure obtained in response to a fixed deceleration by a predetermined amount, thereby obtaining the thrust of the piston corresponding to a desired cut-in pressure.

Figure 5:
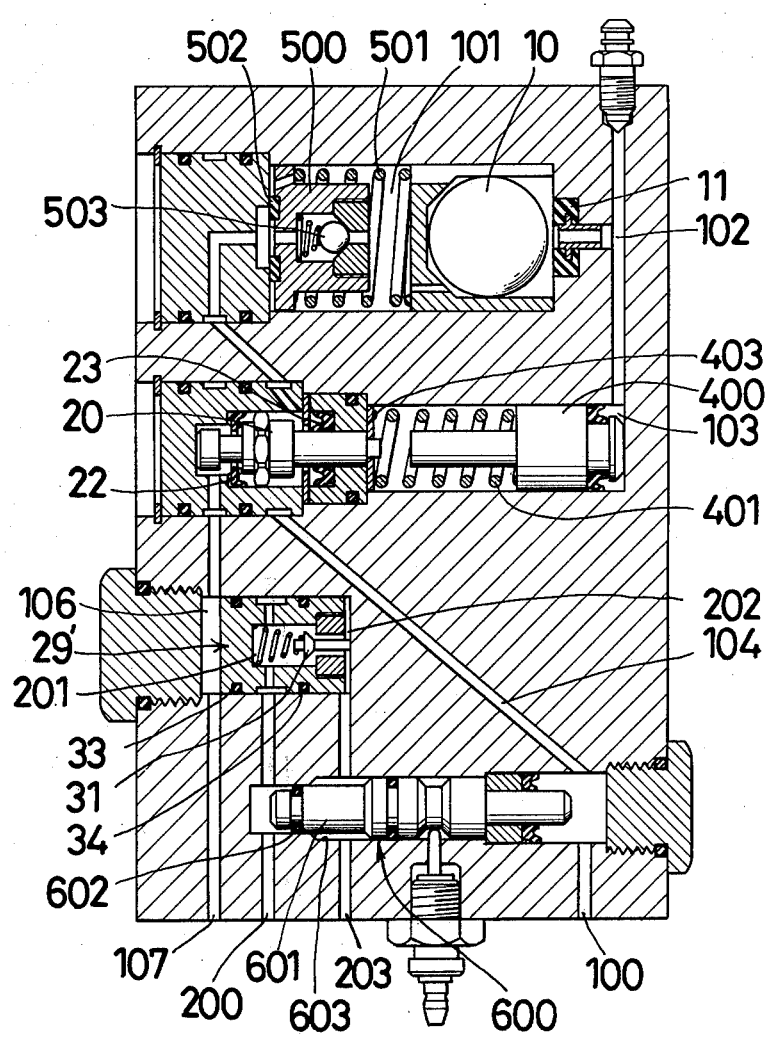
FIG. 5 is a sectional view of the fourth embodiment thereof.

FIG. 5 illustrates the fourth embodiment which includes a deceleration-sensitive, load-responsive pressure control valve with a delay valve in the first circuit and a by-pass valve parallel with a follower valve in the second circuit.

In the first circuit, a delay valve 500 is provided to decrease the inlet pressure from the inlet 100 by an amount determined by the effective area of a valve seat 502 and the force of a spring 501. The delay valve 500 is provided in place of the outer spring 402 in the third embodiment shown in FIG. 4. The pressure in the inertia valve chamber 101 and thus the pressure in the sealing chamber are lower by the predetermined amount than those in the third embodiment. The thrust of the piston 400 is transmitted directly through the spring 401 to the valve body 20 so that a desired cut-in pressure in accordance with the vehicle load can be obtained. A check valve 503 is provided to release the pressure in the sealing chamber 102 when the brake is released.

In the second circuit, a follower valve 29' similar to but simpler than the follower valve 29 in the first embodiment and a by-pass valve 600 parallel with the follower valve 29' are provided in place of the follower valve 29 having a disabling means used in the first embodiment. The by-pass valve employed in this embodiment is known as a differential warning valve. In the event of failure of the first circuit, the valve body 601 moves rightwardly because of absence of pressure from the inlet 100 of the first circuit so that a seal ring 602 will come out into a large-diameter portion 603 of the valve chamber, thus causing the inlet 200 of the second circuit to communicate with the outlet 203.

It is to be noted that the deceleration-sensitive, load-responsive pressure control valve used in the first circuit may be of any known type.

It will be understood from the foregoing that in accordance with the present invention a single deceleration sensing means will function to control two independent proportioning valves. This is very advantageous in view of the fact that the deceleration sensor associated with suitable means for obtaining the control pressure or thrust proportional to the desired cut-in pressure relative to the load condition of the vehicle is complicated in construction and is difficult and expensive to manufacture. Another advantage of the pressure control device according to this invention is that it has a relatively simple construction and is less liable to fail or malfunction due to accumulation of the manufacturing errors.

Although this invention has been described with reference to several preferred embodiments, it is to be understood that various changes or modifications can be made without departing from the scope of this invention.

What are claimed are:

1. A brake pressure control device for a vehicle braking system having a first fluid circuit and a second fluid circuit for supplying fluid under pressure to rear brakes, a single deceleration sensing means only in the first fluid circuit, and means responsive to said deceleration sensing means and to the load of the vehicle by means of fluid pressure sealed in said control device upon the occurrence of a deceleration sensed by said deceleration sensing means.

2. The device as claimed in claim 1 wherein a load-responsive pressure control valve including said deceleration sensing means is provided in said first circuit and a follower valve adapted to give an output pressure in accordance with the output pressure of said control valve is provided in said second circuit.

3. The device as claimed in claim 2 wherein said follower valve in the second circuit comprises a main valve adapted to open when the output pressure of said control valve in the first circuit is equal to or larger than the output pressure of the follower valve, and to close when the former is smaller than the latter and a bypass valve arranged in parallel with said follower valve so that fluid in the second circuit will bypass said follower valve in the event of failure of the first circuit.

4. The device as claimed in claim 2 wherein said follower valve has means for disabling itself and passing fluid from the inlet of said second circuit directly to the outlet thereof without preforming any function as a follower valve in the event of failure of the first circuit.

5. The device as claimed in claim 4 wherein said follower valve in the second circuit has a valve body urged in the valve opening direction by the output pressure of the first circuit and the input pressure of the second circuit and urged in the valve closing direction by the output pressure of the second circuit and the input pressure of the first circuit, the effective area acted on by the input pressure of the first circuit being equal to that acted on by the input pressure of the second circuit, the effective area acted on by the output pressure of the first circuit being equal to that acted on by the input pressure of the second circuit, and the effective areas acted on by both input pressures being larger than those acted on by both output pressures.

6. The device as claimed in claim 1 wherein a pressure control valve including said deceleration sensing means is provided in said first circuit and a pressure control valve with no deceleration sensing means is provided in said second circuit, both pressure control valves being controlled by the sealed control pressure obtained by means of said deceleration sensing means.

7. The device as claimed in claim 6 wherein said deceleration sensing means has a rate of deceleration at which said deceleration sensing means operate which changes in response to the vehicle load.

8. The device as claimed in claim 6 wherein the pressure control valve in said second circuit has means for either increasing the cut-in pressure or disabling itself for not performing a pressure reducing function in the event of failure in the first circuit.

9. The device as claimed in claim 6 wherein a bypass valve is provided in parallel with the pressure control valve is the second circuit so as to bypass said control valve for stopping it from performing any pressure reduction in the event of failure of the first circuit.

10. The device as claimed in claim 1 wherein a pressure control valve having said deceleration sensing means is provided in said first circuit and a pressure control valve with no deceleration sensing means is provided in said second circuit, and means is provided for converting the sealed control pressure obtained by said deceleration sensing means to a thrust corresponding to the desired cut-in pressure and using said thrust to control the pressure control valves in both of the circuits.

11. The device as claimed in claim 10 wherein a delay valve is provided in series with said deceleration sensing means so that the sealed control pressure obtained by said means is proportional to the cut-in pressure suitable for the vehicle load condition.

12. The device as claimed in claim 10 wherein the means for converting the sealed control pressure obtained by the deceleration sensing means to the thrust is a piston, and a spring engaged by said piston for transmitting part of said thrust proportional to the cut-in pressure suitable for the vehicle load condition to the pressure control valves in both of the circuits.

13. The device as claimed in claim 10 further comprising a thrust distributing means for distributing the thrust to two pressure control valves, said thrust distributing means comprising means for, in the event of failure of one of the two circuits, preventing free movement of the pressure control valve in the other circuit for disabling it.

* * * * *